No. 691,138. Patented Jan. 14, 1902.
B. HAWLEY.
PROCESS OF MAKING PICTURES.
(Application filed Sept. 13, 1901.)
(No Model.)
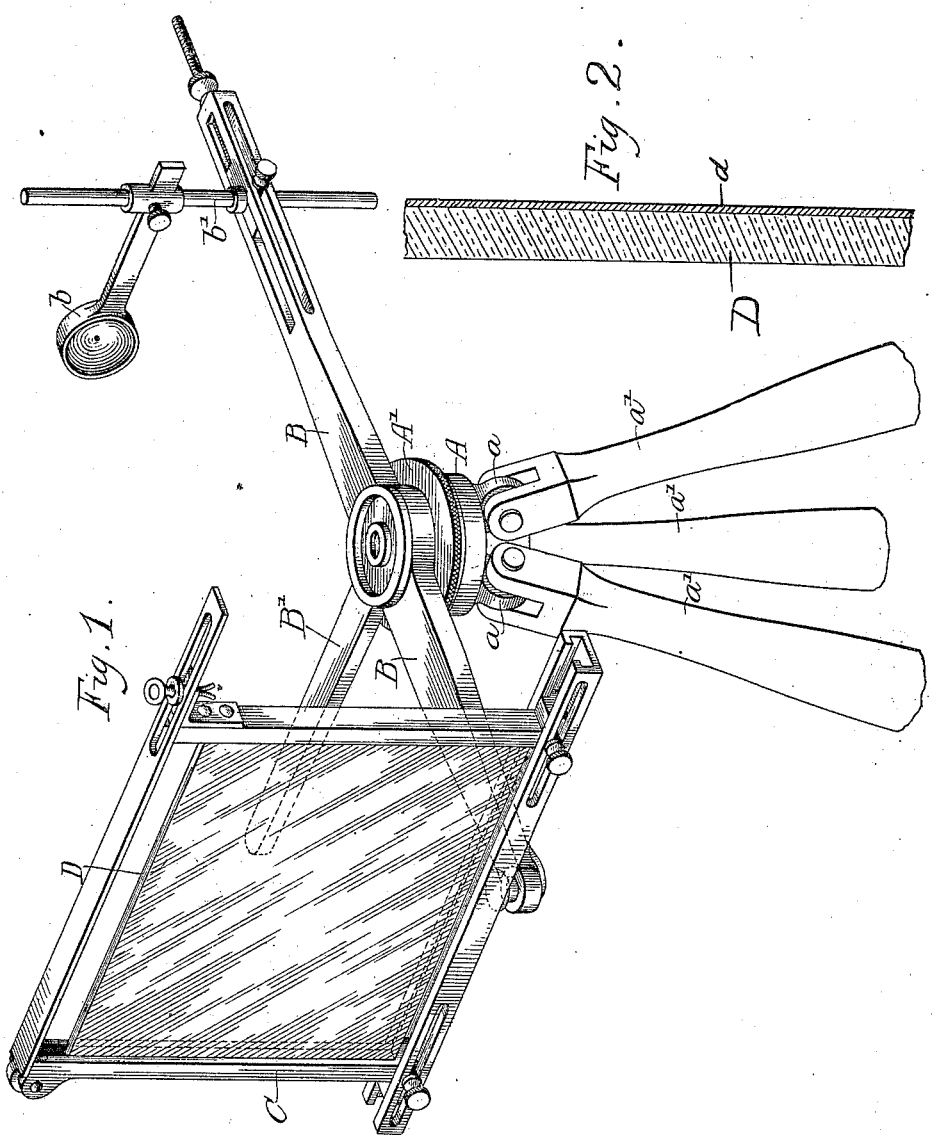
Witnesses:-
Louis H. T. Whitehead.
Herman E. Metius.
Inventor:-
Benjamin Hawley
by his Attorneys:-
Howson & Howson
THE NORRIS PETERS CO., PHOTO-LITHO., WASHINGTON, D. C.

UNITED STATES PATENT OFFICE.

BENJAMIN HAWLEY, OF PHILADELPHIA, PENNSYLVANIA.

PROCESS OF MAKING PICTURES.

SPECIFICATION forming part of Letters Patent No. 691,138, dated January 14, 1902.

Application filed September 13, 1901. Serial No. 75,308. (No specimens.)

*To all whom it may concern:*

Be it known that I, BENJAMIN HAWLEY, a citizen of the United States, residing in Philadelphia, Pennsylvania, have invented certain Improvements in Processes of Making Pictures, of which the following is a specification.

My invention relates to certain improvements in processes for making etchings or engravings, having for its object the provision of a method whereby a surface may be engraved directly from an object sought to be pictured with any desired degree of detail, and from this surface any desired number of prints or impressions may be secured. This object I attain as hereinafter set forth, reference being had to the accompanying drawings, in which—

Figure 1 is a perspective view representing one form of apparatus constructed to be used in carrying out my improved process; and Fig. 2 is a sectional view, on an enlarged scale, of a plate of glass, showing one of its faces coated with gelatin.

In the above drawings, A is a tripod-head having depending lugs $a$, to which are pivoted legs $a'$, forming a tripod of ordinary form.

A' is a plate screwed to the head A and carrying a bar B, pivoted to it so as to be free to turn in a horizontal plane. This bar projects on both sides of the head A and has an arm-rest B' extending at right angles to it and rigidly fastened to the plate A'. One end of the bar B carries an eyepiece $b$, which is vertically adjustable on a rod $b'$, this latter also being capable of adjustment in a horizontal line toward or from the tripod and having means provided for locking these parts in any position to which they are adjusted. Pivoted to the opposite end of the bar B is a frame C, constructed to hold a transparent plate D— of glass, for example—and having its sides preferably adjustable, so that it may be made to accommodate varying sizes of plates. The said plate D is coated with a relatively thin film $d$ of some transparent substance—such as gelatin, as shown in Fig. 2, collodion, or the like—in which it is possible to cut or grave with a suitable tool.

In carrying out my process with this apparatus the tripod, with its frame and eyepiece, is set up so as to be in the proper position with relation to an object which it is desired to picture, and the lines necessary for a representation of the same are engraved on the plate D, the various features of shading, detail, &c., being engraved upon the plate as indicated to the eye of the operator looking through the eyepiece $b$.

It will be noted that as soon as the relative positions of the object to be sketched and the eye of the observer are fixed it is possible to draw or grave with great accuracy upon the prepared surface of the plate D, by this means obtaining direct from the object a drawing practically perfect as to perspective and detail. The plate so engraved is then removed from the frame and inked, the ink entering the engraved lines in the manner well known to the art, any number of prints being taken therefrom in the well-known way.

The plate or backing D is preferably of glass or other transparent substance, and in covering one of its faces with a film of material upon which it is desired to engrave I usually employ a transparent preparation of gelatin, the same being mixed with suitable substances to harden it to overcome its tendency to swell and change shape under the variations of the atmospheric temperature and moisture.

It will be seen that by my process I am enabled to make engravings direct from nature in a way not hitherto possible, and from these engravings to produce proofs, pictures, or prints practically perfect as to perspective and with an amount of shading and detail depending entirely upon the will of the operator. It will also be noted that the process as a whole is an exceedingly simple one, it being possible for a person totally without artistic education to make excellent pictures and that with but little practice.

It will be noted that I do not confine myself to any particular form of apparatus for carrying out my improved process, for it may be considerably modified without departing from my invention, the essential feature of which consists in graving upon a transparent film carried upon a suitable backing, also transparent, an object seen through the same and printing pictures from the engraving so obtained.

It will be understood by those skilled in the art that it is possible to secure prints from my engraved plates otherwise than by inking, as, if desired, the plate finished may be subjected to treatment which will darken or render the lines thereon partially or wholly opaque, photographic prints being produced from the negative so formed in the well-know way.

I claim as my invention—

1. The process of producing a picture, said process consisting of locating a transparent plate between the object to be copied and the eye, said plate being distant from both the object and the eye, and engraving the image of said object upon the said plate to form a negative and taking an impression from said negative, substantially as described.

2. The herein-described process of producing a picture, the same consisting of mounting a transparent plate some distance in front of the body to be copied, locating the eye of the operator at a fixed point some distance in front of the plate, whereby said object is seen through said plate in perfect perspective, etching the surface of said plate on the lines of the object seen therethrough, and printing from said etching, substantially as described.

3. The herein-described process of producing drawings direct from an object, the same consisting in graving on a film of a transparent gelatinous substance carried upon a plate of glass, the image of said object seen when the same is observed by looking through the plate from a fixed point, said plate being placed at a distance from both the object and the eye of the observer, applying ink to the lines so produced and making a print from the same, substantially as described.

In testimony whereof I have signed my name to this specification in the presence of two subscribing witnesses.

BENJAMIN HAWLEY.

Witnesses:
WILLIAM E. BRADLEY,
JOS. H. KLEIN.